United States Patent [19]

Gaiser et al.

[11] 4,395,222

[45] Jul. 26, 1983

[54] INJECTION MOLDING APPARATUS

[75] Inventors: William R. Gaiser, Dayton, Ohio; John W. Gaiser, Schaumburg, Ill.

[73] Assignee: The Broadway Companies, Inc., Dayton, Ohio

[21] Appl. No.: 263,841

[22] Filed: May 15, 1981

[51] Int. Cl.³ .............................................. B29F 1/00
[52] U.S. Cl. .................................... 425/548; 425/572; 425/588
[58] Field of Search ..................... 425/547, 328.1, 549, 425/550, 538, 526; 264/DIG. 46

[56] References Cited

U.S. PATENT DOCUMENTS

| | | | |
|---|---|---|---|
| 2,239,338 | 4/1941 | Norelli | 18/30 |
| 2,672,653 | 3/1954 | Simpkins et al. | 18/42 |
| 2,871,517 | 2/1959 | Allard | 18/30 |
| 3,093,865 | 6/1963 | Peters et al. | 18/42 |
| 3,159,878 | 12/1964 | Scott, Jr. et al. | 18/30 |
| 3,520,026 | 7/1970 | Stidham et al. | 18/30 |
| 3,661,490 | 5/1972 | Trueblood | 425/243 |
| 4,108,956 | 8/1978 | Lee | 425/547 |
| 4,161,386 | 7/1979 | Osuna-Diaz | 425/547 |
| 4,219,323 | 8/1980 | Bright et al. | 425/572 |
| 4,230,934 | 10/1980 | Beek et al. | 425/547 |

FOREIGN PATENT DOCUMENTS

| | | | |
|---|---|---|---|
| 2816413 | 7/1979 | Fed. Rep. of Germany | 425/547 |
| 2308223 | 11/1976 | France | 425/547 |
| 41-11742 | 6/1966 | Japan | 425/547 |

Primary Examiner—Jay H. Woo
Attorney, Agent, or Firm—Biebel, French & Nauman

[57] ABSTRACT

An injection molding apparatus includes an injector portion which includes a plurality of mold cavity modules each having a plurality of cavities cooled by fluid flowing through a plurality of cooling channels which communicates with a common coolant manifold. Each mold cavity module is supplied with molten plastic material by a separate manifold which consists of an elongated shell having an exterior surface defining at least one inlet sprue communicating with a source of plastic and a plurality of outlet gates each communicating with a cavity of the mold module, a tubular heating element positioned within the shell for heating the interior portion of the shell, and a plurality of runners extending from the inlet sprue to the outlet gates and spiral about the heating rod so that molten plastic material may flow from the inlet sprue through the runners to the outlet gates and receive heat energy from the heating rod.

14 Claims, 8 Drawing Figures

INJECTION MOLDING APPARATUS

BACKGROUND OF THE INVENTION

1. Field of the Invention

This invention relates to injection molding machines, and more particularly to the injector portion which conveys molten liquid plastic material from a source of liquid plastic to the mold cavities of the injection molding apparatus.

2. Prior Art

Injection molding machines are widely used for the rapid and repeated molding of articles from thermoplastic materials, such as polyethylene, polypropylene, polyethylene terephthalate, and polyvinylchloride. Such machines typically include an injector portion in which a molten thermoplastic material is injected into a mold cavity to form an article, and an ejector portion which withdraws the cooled molded article from the cavity and ejects it into a catcher or similar receptacle.

The injector portion of the machine typically includes a hopper for receiving beads of a selected thermoplastic material which communicates with a reciprocating helical screw mounted within a heated casing. The screw conveys the beads of thermoplastic material along the heated casing at which time the beads melt and become a liquid mass. The casing necks down to an orifice which communicates with a manifold, and reciprocation of the screw projects a charge of the material into the manifold. The manifold receives the heated and liquified plastic material from the orifice into a sprue and conveys it through runners to a plurality of gates. Each gate communicates with a mold cavity and the plastic material flows into the cavity to form the molded article.

The ejector portion of the injection molding machine typically includes a plurality of cores shaped to fit into the cavity and about which the molded article is formed. The cores are mounted on a frame which is mounted on a reciprocating platen so that the cores are movable into and out of the cavities. The frame may include means, such as movable jaws, for gripping the cooled molded article so that the article will remain on the core and will be removed from the cavity when the cores are withdrawn from the cavity. The gripping means may also be capable of ejecting the solidified article into a catcher or other receptacle which removes the articles from the injection molding machine to a remote location for packing and shipping.

Much consideration has been given to the arrangement and construction of the aforementioned manifold, and to manifolds which can convey the molten plastic from a single outlet orifice to a plurality of cavities without the plastic freezing or solidifying in the manifold runners.

For example, U.S. Pat. No. 2,672,653 discloses a mold manifold which forms a plurality of runners connecting the inlet sprue to a plurality of outlet gates. The manifold also includes bores for receiving heating elements to insure that the liquid plastic does not solidify within the runners. However, manifolds of this design possess a disadvantage in that the lengths of the runners between the inlet sprue and the outlet gates are not equal. Therefore, the time required for plastic material entering the inlet sprue to flow to the mold cavities varies from cavity to cavity.

In addition, the location of the heating elements is undesirable in that the distances from the heating element to the runners are not constant. Therefore, portions of the runners will receive more heat energy than others, resulting in uneven heating. Such an arrangement of a heating element is undesirable also in that greater total heat energy is required to raise the temperature of a manifold to achieve the minimum required temperature in those portions of runners or outlet gates which are more distant from the heating element, than if all portions of runners and all gates were equidistant from a heat source. This results in wasted heat energy and higher operating expenses.

Another type of manifold is disclosed in U.S. Pat. No. 3,520,026. This patent is directed to a manifold for an injection molding machine which is itself a resistance heating element. The manifold contains two runners which are formed such that the distance from the inlet sprue to the outlet gate is the same for each runner. However, such a manifold design possesses an inherent disadvantage of wasting much heat energy which is radiated to the surrounding environment. Since the air surrounding the heated manifold is generally cooler than the liquid plastic material flowing within the heated manifold, the rate of heat flow outward to the surface is greater than the rate of heat flow inward to the runners. In addition, the patent discloses a manifold for conveying plastic from a single inlet sprue to outlet gates but does not disclose a means for conveying plastic to a plurality of outlet gates in such a manner that the runners are of equal length.

Another example of a manifold having runners of equal length is disclosed in U.S. Pat. No. 4,219,323, assigned to the assignee of the present invention. This patent discloses a manifold in which the runners are heated by a plurality of heating elements positioned within bores in the manifold. The necessity of a plurality of heating elements is undesirable in that it adds to the expense and complexity of the manifold.

In the manufacture of parisons which are later blow molded to form beverage containers, an additional problem is encountered. If the molten plastic material, typically polyethylene terephthalate, is allowed to remain in a heated liquid state for too long a time, the amount of acetaldehydes formed prior to cooling will be sufficient to taint the flavor of the beverage to be carried in the container. Therefore, the length of the runners in a manifold must be minimized to shorten the heat history of the plastic material.

In injection molding of parisons, it is desirable to have a large number of mold cavities in operation with a minimal amount of downtime for repair or replacement of the mold cavities. Typically, a single injection molding machine may have from 20 to 50 cavities in continuous operation during a molding operation. The breakdown of a single cavity may in some cases necessitate the interruption of the operation of the entire machine in order to effect repair.

Accordingly, there is a need for a manifold for use with an injection molding machine that is capable of conveying heated liquified plastic from an inlet sprue to a plurality of cavities in such a manner that the plastic is maintained in a liquid state with a minimum of energy expenditure and complication. There is a need for a manifold with runners of a minimal length to minimize the heat history of the material conveyed, and, there is a need for a manifold in which the runner paths from the inlet sprue to each outlet gate are of the same length. There is also a need for an injection molding machine in which the breakdown of a single mold cavity does not cause extensive downtime of the apparatus to effect repair.

SUMMARY OF THE INVENTION

The present invention provides an improved injection mold which includes a manifold having runners extending from an inlet sprue to a plurality of outlet gates in equidistant paths such that the mold cavities can be filled simultaneously. This feature facilitates the rapid operation of the injection molding machine in which the manifold is mounted. In addition, the manifold runners are formed about a centrally located heating element, all parts of the runners are the same distance from the heating element, and the liquified plastic conveyed therein is evenly heated. This construction also optimizes the heating efficiency of the heating element: since the heat energy radiates outward from the element, it is first transferred to the liquified plastic in the runners then passes to the exterior of the manifold.

The manifold of the present invention includes runners extending from a single inlet sprue to a plurality of outlet gates of a minimal length to reduce the heat history of the material conveyed. This aspect permits the use of such manifolds in connection with the molding of parisons to be used in the blow molding of beverage containers.

The manifold of the present invention comprises a shell having an interior surface which defines a cylindrical bore, a cylinder sized to fit within the bore, and a tubular heating element which extends through the center of the cylinder. The shell has an inlet sprue which communicates with the orifice of a heated casing which houses the helical screw and a plurality of outlet gates, each communicating with a mold cavity. The cylinder, mounted within the shell, has a sprue recess which is in registry with the inlet sprue of the shell and a plurality of gate recesses, each in registry with an outlet gate. The shell preferably is insulated to prevent radiant heat loss from the manifold.

The cylinder has an outer surface which defines a plurality of channels which extend from the sprue recess and spiral about the tubular heating element to the gate recesses. When the cylinder is mounted within the cylindrical bore of the shell, the interior surface of the shell mates with the cylinder and covers the channels to form the runners of the manifold. Since the channels are formed on the outer surface of a cylinder carrying a centrally mounted tubular heating element, all the runners are located a constant distance from a single heating element. The cylinder preferably includes thermocouples which monitor the temperature of the manifold and generate a signal to a control which selectively activates the heating element.

In a preferred embodiment, a primary manifold constructed in accordance with the invention has an inlet sprue communicating with the orifice of the screw conveyor of the injection molding machine and has, for example, four outlet gates, each in turn communicating with an inlet sprue of a separate secondary manifold. The four secondary manifolds are each constructed in accordance with the invention and oriented normal to the primary manifold. Each secondary manifold has, for example, six outlet gates, each communicating with a separate mold cavity. In this fashion, twenty-four mold cavities can be served by a single screw conveyor and the runners which extend from the orifice to each cavity are of equal length.

With this preferred embodiment, the mold cavities are constructed in modules of, for example, six, and four modules are used, each placed in parallel relationship to a secondary manifold so that the six outlet gates of a manifold are in registry with the inlets to the six cavities of the module. Each cavity module consists of a block having a plurality of cooling channels formed within it and six cylindrical bores sized to receive the mold cavities. The cooling channels communicate with the mold cavities and with a coolant manifold that supplies coolant to cool the cavities of all the cavity modules.

Such an array of cores permits substantially continuous operation of an injection molding machine. If a particular runner or cavity becomes clogged or damaged, the module and/or manifold to which the cavity or runner belongs may be removed and replaced by a different module and/or manifold so that downtime for the entire injection molding machine would be minimized.

There are several advantages inherent in the construction of the preferred embodiment of the invention. The manifold construction allows flexibility in the construction of the injector portion of the injection molding machine. Mold cavity arrays of any desired shape or size may be put together utilizing different combinations of manifolds and manifolds having various numbers of outlet gates.

The construction of the manifolds is relatively uncomplicated and they do not require moving parts for their operation. Each part of the manifold can be fabricated of tool steel or a more expensive beryllium copper alloy for better heat conduction. The cylinder can be sealed within the shell by welding or other conventional methods.

Another advantage lies in the fact that each manifold requires only a single heating element and the spiral runners are so arranged that they are evenly heated along their lengths by this single element; a design that reduces the complexity and increases the efficiency of the manifold unit.

Accordingly, it is an object of the invention to provide an improved manifold for an injection molding machine that is capable of conveying molten plastic material from an inlet sprue to a plurality of outlet gates through runners of equal length; to provide a manifold having runners which spiral about and are equidistant from a single centrally located heating element so heating is even and heat loss is minimized; to provide a manifold with runners of a short length to minimize the heat history of the material conveyed; to provide a manifold for use in constructing a modular array of cavities; to provide a manifold having a manifold of simple construction which is easy to fabricate and is of low cost; and to provide a manifold which may be used with mold cavity modules which are replaceable with a minimum of downtime.

These and other objects and advantages of the invention will be apparent from the following description, the accompanying drawings, and the appended claims.

DETAILED DESCRIPTION OF THE PREFERRED EMBODIMENTS

Figure 1:
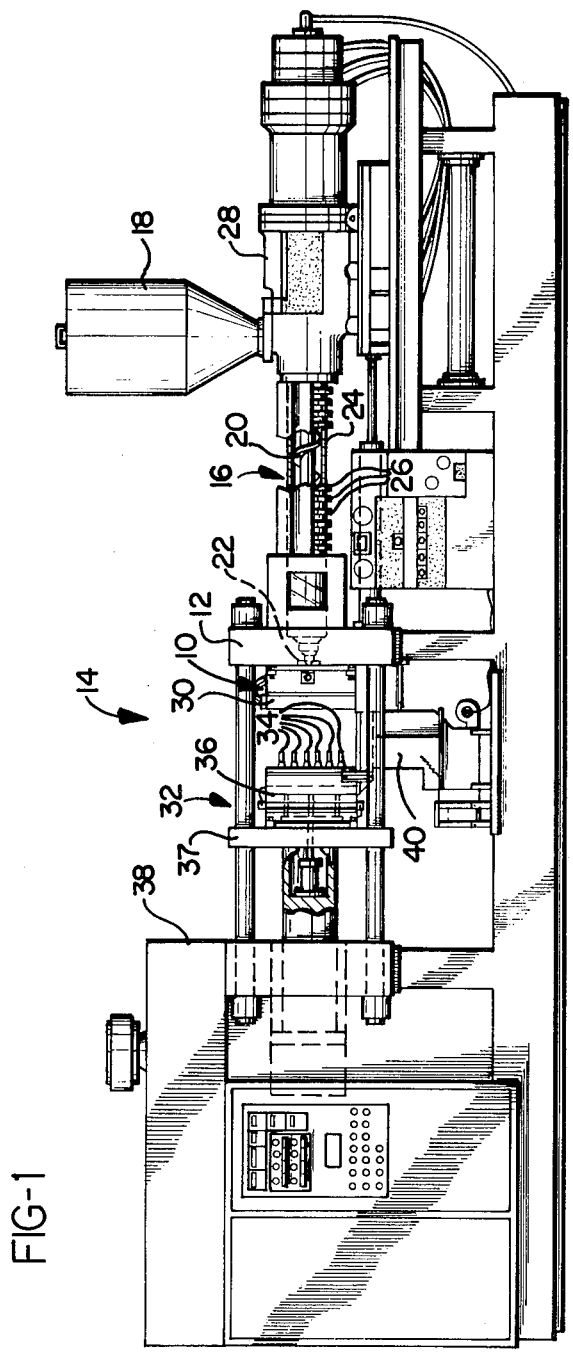
FIG. 1 is a side elevation of an injection molding machine incorporating the manifold of the present invention.

As shown in FIG. 1, the manifold of the present invention, generally designated 10, is mounted on a fixed platen 12 of an injection molding machine of the type used to form parisons, generally designated 14. The molding machine 14 includes an injector portion 16 which consists of a hopper 18 for loading granulated thermoplastic material (not shown) into the machine, a helical screw 20, and an orifice 22 which communicates with the manifold 10. The screw 20 is enclosed in a housing 24 which includes heating bands 26 so that the plastic material is liquified as it is urged along the housing 24 by the screw 20. The screw 20 also include a hydraulic apparatus 28 which causes the screw to reciprocate within the housing 24 so that a charge of molten plastic material conveyed to the orifice 22 by screw 20 can be forced into the manifold 10. The manifold 10 supports a mold cavity array 30.

The molding machine 14 also includes an ejector portion 32 which consists of a plurality of cores 34 mounted on a support frame 36 supported by a movable platen 37 capable of reciprocal movement by a hydraulic apparatus 38. The cores 34 include means (not shown) for gripping a molded parison. The cores 34 are positioned to be displaced into the mold cavities 39 (FIG. 5) by action of the hydraulic apparatus 38. While the cores 34 are within the cavities 39, plastic is injected by the screw conveyor 20 and hydraulic apparatus 28 through the manifold 10 into the cavities to form the molded article. After the molding process has been completed and the molded product has cooled sufficiently, the hydraulic apparatus 38 withdraws the cores 34 from the cavities 30 and the cores are ejected into a receptacle such as a catcher 40.

Figure 2:
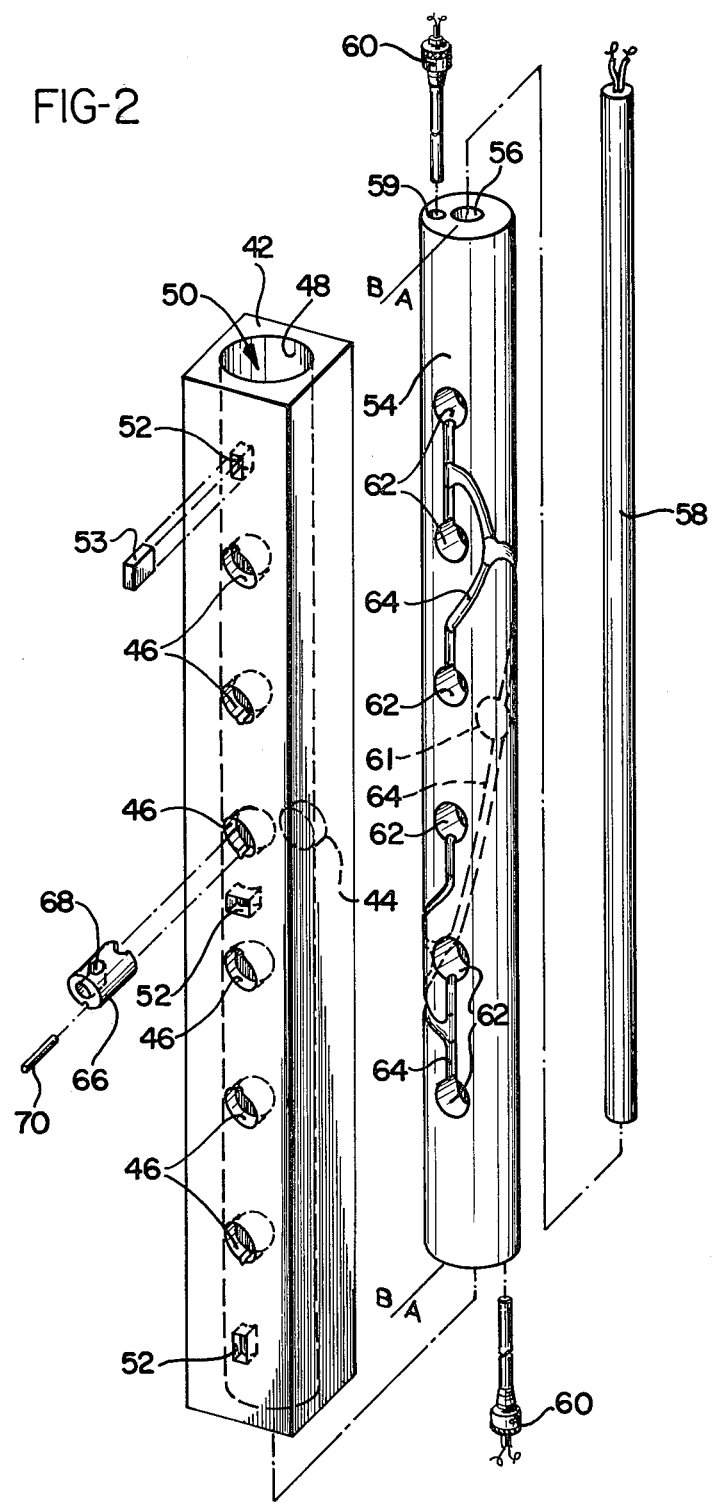
FIG. 2 is an exploded view, in perspective, of the manifold of the present invention.
Figure 3:
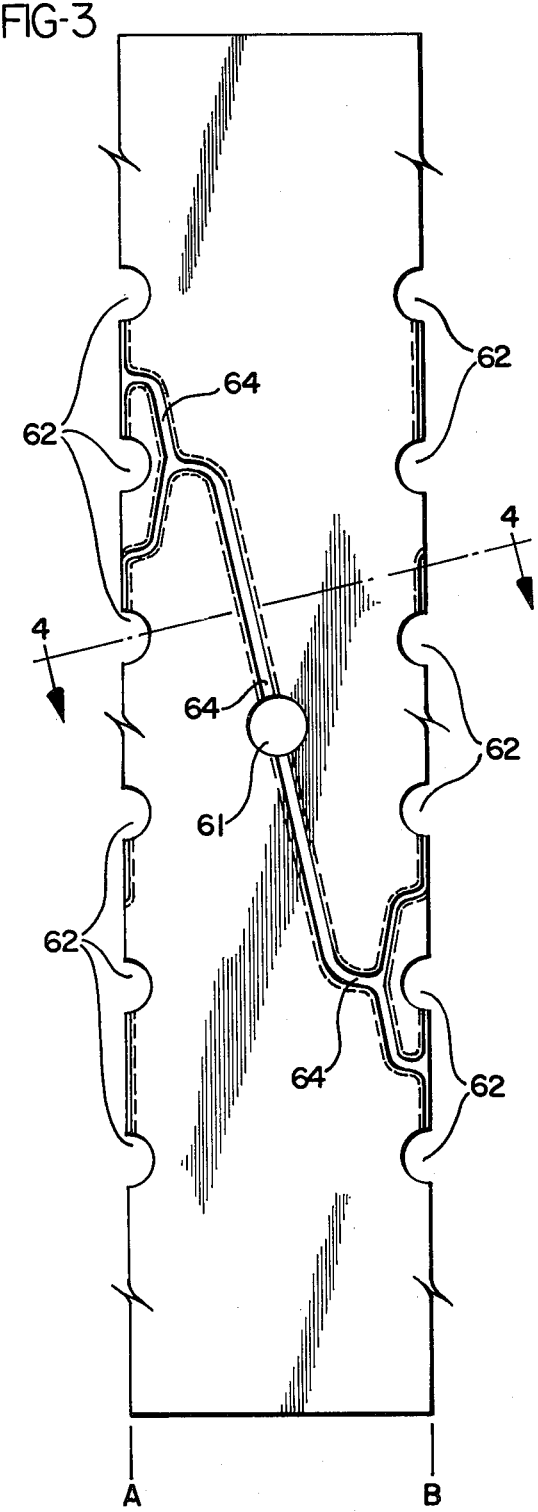
FIG. 3 is a developed lengthwise view of the surface of the cylinder of the manifold of FIG. 2 taken at lines A-B.
Figure 4:
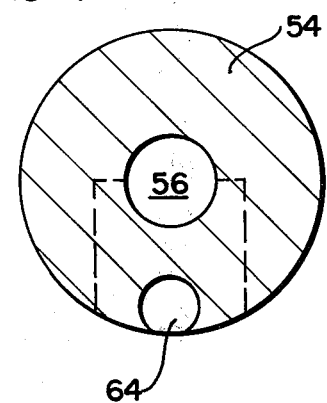
FIG. 4 is an end section of the cylinder taken at line 4—4 of FIG. 3.

The manifold 10 of the present invention is best shown in FIGS. 2, 3, and 4. The manifold 10 consists of an outer shell 42 having an inlet sprue 44, outlet gates 46 and an interior surface 48 defining a cylindrical bore 50. The outer surface of the shell 42 may also contain key slots 52 to receive keys 53 which aid in aligning the manifold 10 with the orifice 22 on the platen 12.

Mounted within bore 50 is a cylinder 54 having a central longitudinal passage 56. A tubular resistance type heating element 58 is mounted within the central passage 56. Cylinder 54 may also include holes 59 to receive thermocouples 60. The thermocouples 60 monitor the temperature of the cylinder 54 and generate a signal to a control (not shown) which selectively activates element 58, in a manner well known in the art.

On the surface of the cylinder 54, best shown in FIG. 3, is formed a sprue recess 61 and a plurality of gate recesses 62. In forming the sprue recess 61 and gate recesses 62, it is preferable simply to drill a hole of the appropriate size from the outer surface of the cylinder 54 through to the central longitudinal passage 56.

The sprue recess 61 and gate recesses 62 are joined by channels 64 formed on the outer surface of the cylinder 54. As best shown in FIG. 4, the channels 64 have a circular profile and preferably are formed with the use of a ball cutter. When the cylinder 54 is then positioned within the outer shell 42, the interior surface 48 covers the channels 64 to form runners (shown in FIGS. 6 and 7) having a substantially circular cross section, which gives clean, unrestricted flow thru channels and prevents build-up of plastic material.

When the cylinder 54 is mounted within the shell 42 and the sprue and gate recesses 61, 62 are in registry with the inlet sprue and outlet gates 44, 46, nozzles 66 (FIG. 2) are inserted into the sprue and gate recesses. Each nozzle 66 is cylindrical in shape and has an elbow-shaped pathway 68 formed in its interior so molten plastic material passing through the nozzle is directed along an appropriate channel 64 and is prevented from entering the central longitudinal passage 56. The nozzles 66 are maintained in position by keys 70 which fit into mating key slots 72 formed in the shell 42 (FIG. 2).

Figure 5:
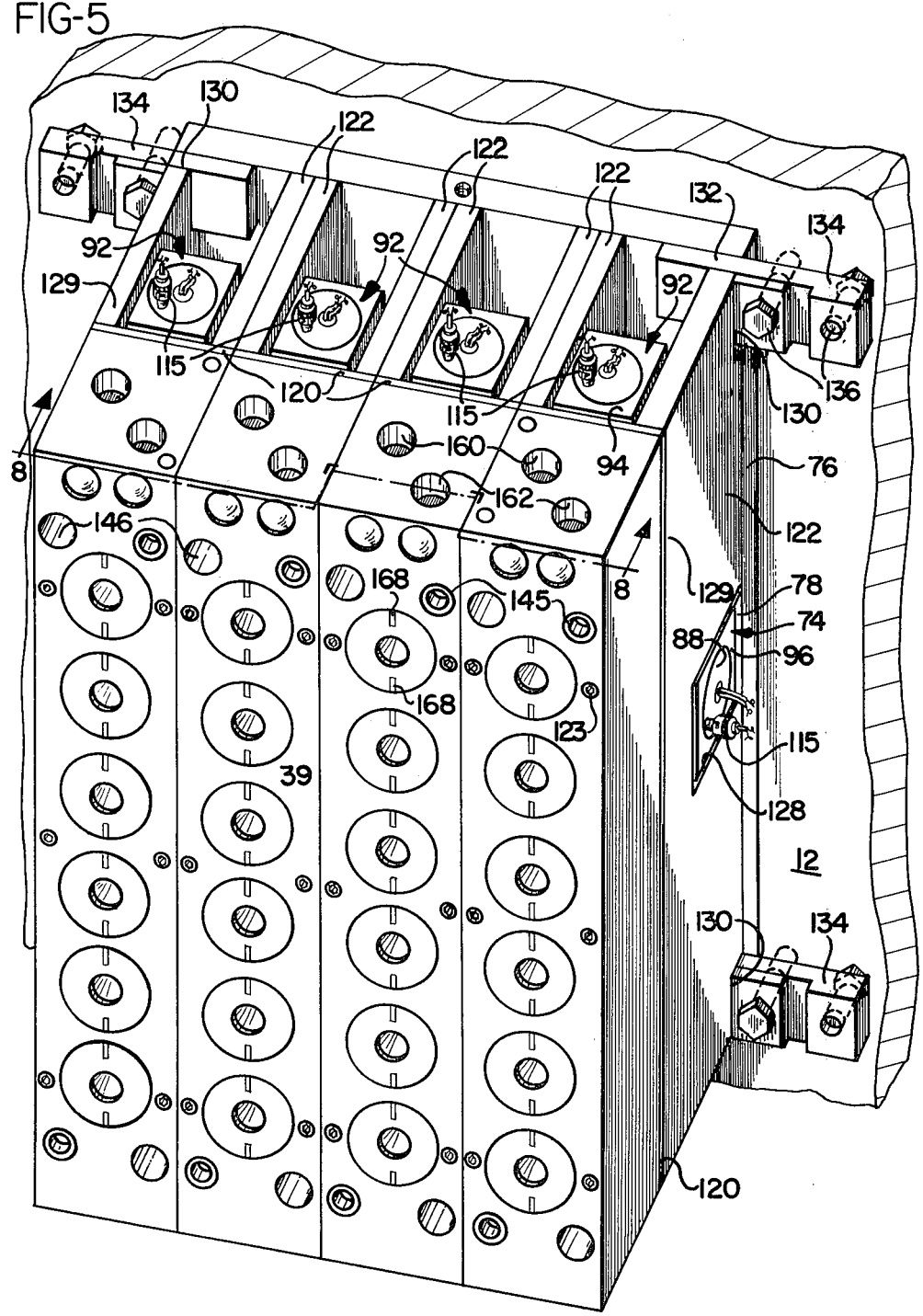
FIG. 5 is a perspective view of an array of mold cavities and manifolds of the type in FIG. 2 mounted on a platen, and in which the coolant manifold is removed.
Figure 6:
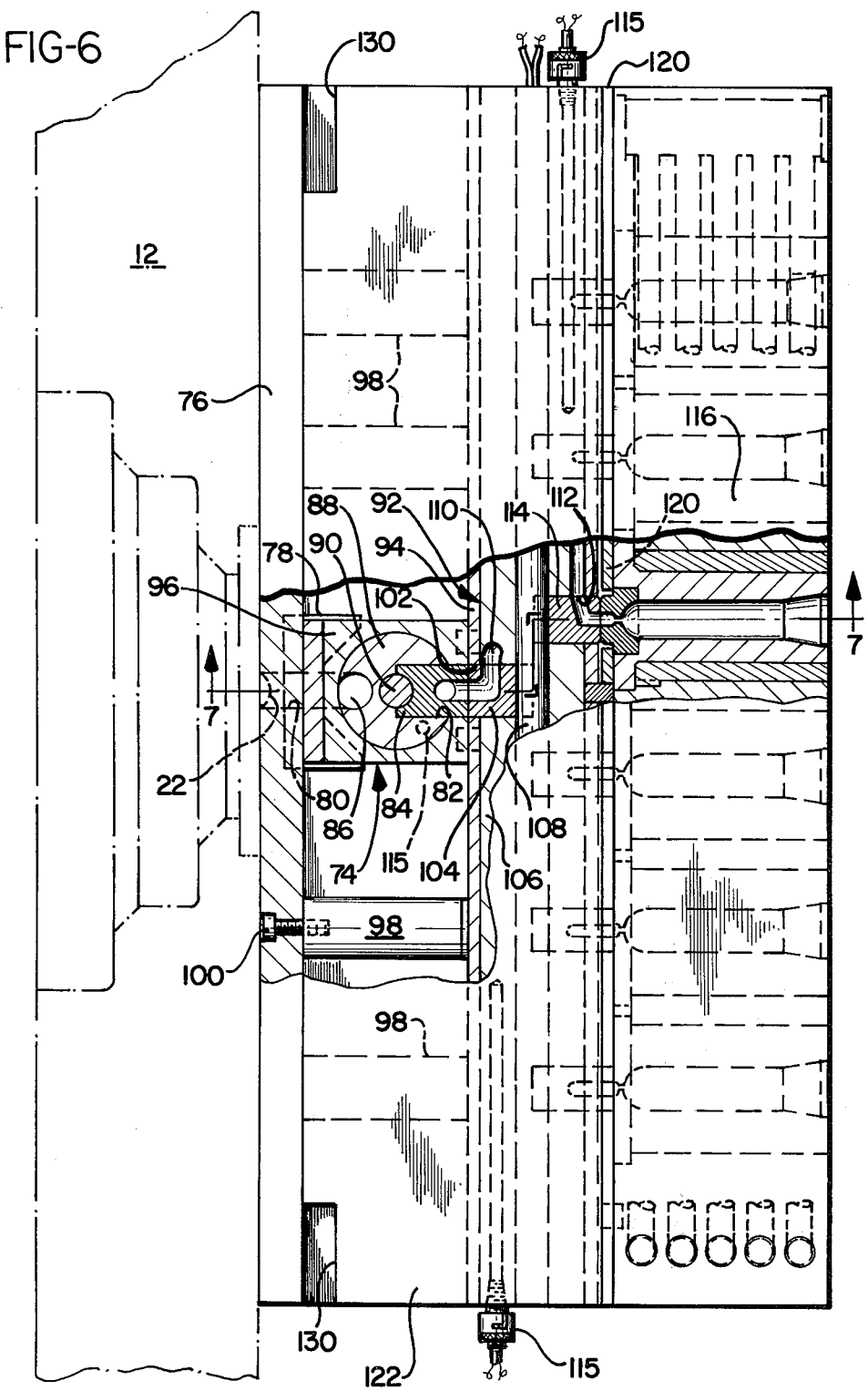
FIG. 6 is a side elevation of the array of FIG. 5, partially broken away to show a mold cavity, a portion of the secondary manifold, and an end section of the primary manifold.

The preferred embodiment of the invention is shown in FIGS. 5, 6, 7, and 8. As shown in FIGS. 5 and 6, a primary manifold 74 is mounted on a base plate 76 by means of a mounting bracket 78. The primary manifold 74 includes an inlet sprue 80 (FIG. 6) which communicates with the orifice 22 of the screw conveyor formed in the fixed platen 12. The inlet sprue is connected to an outlet gate 82 which receives an outlet nozzle 84 by means of runners 86 formed on the surface of a cylinder 88 in the manner of the invention. A tubular heating element 90 extends along the primary manifold 74 to prevent freezing of the liquid plastic material flowing through the runners 86.

The primary manifold 74 has four outlet gates 82, each of which feeds into a secondary manifold 92. It should be noted that the primary manifold can be designed in the manner of the invention and have any number of runners and outlet gates. The shells 94 of the secondary manifolds abut the shell 96 of the primary manifold and the shells 94 are arranged at right angles to the primary shell 96, as shown particularly in FIG. 5. The arrangement is held in position by means of spacer columns 98 which are mounted on the base plate 76 by bolts 100.

Each secondary manifold 92 is constructed in accordance with the invention and includes an inlet sprue 102 which receives an inlet nozzle 104, a cylinder 106 having a heating element 108 and runners 110, and six outlet gates 112, each connected to the inlet sprue 102 by a runner and having an outlet nozzle 114. The secondary manifolds may have more or less than six outlet gates as desired. Both primary and secondary manifolds 74, 92 include thermocouples 115 that function in the manner previously described.

Each secondary manifold 92 is associated with a cavity module, generally designated 116, having six mold cavities 39. The cavity modules 116 are separated from the secondary manifolds 92 by an insulation plate 120. The cavity modules 116 collectively make up the mold cavity array 30 and are mounted on side walls 122 by hex head bolts 123. The side walls 122 are, in turn, attached to the base plate 76 by bolts 124 and press-fitted pins 126 in a conventional manner. The side walls 122 each define a cut-out 128 shaped to receive the primary manifolds 74. End side walls 129 define notches 130 which are sized to receive a flange 132 of a mounting bracket 134 which is held to the platen 12 by means of mounting bolts 136.

Figure 8:
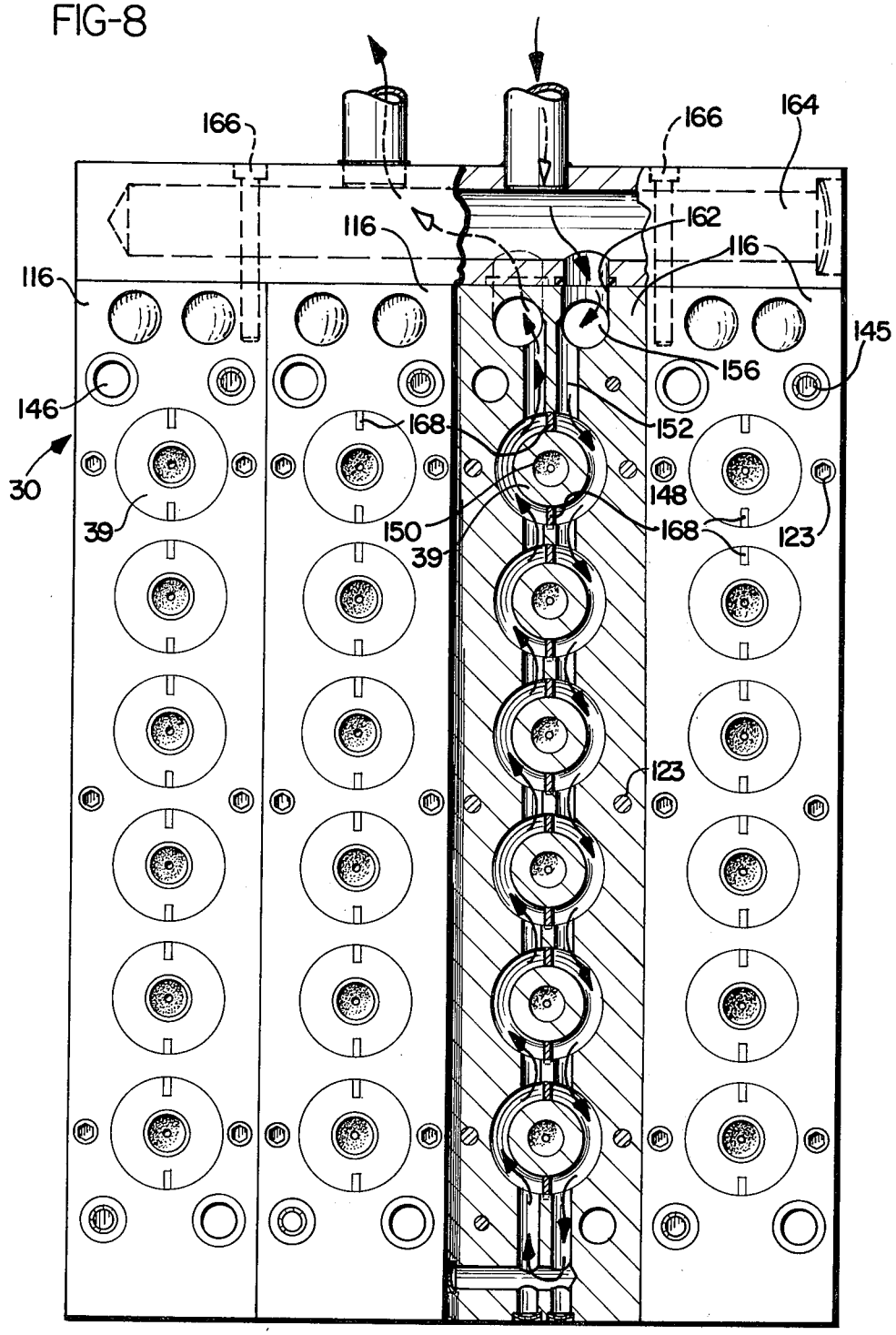
FIG. 8 is a front elevation of the array of FIG. 5 in which one cavity module is shown in section, taken at line 8—8, and to which the coolant manifold is added and partially broken away.

As best shown in FIGS. 5 and 8, each mold cavity module 116 consists of a block 138 having six cylindrical bores 140 passing from a front face 142 to a rear face 144. The front face 142 may include taper lock recesses 145 and guide pin recesses 146 to receive taper locks and guide pins from the ejector portion to insure proper engagement of the cores within the cavities. The bores 140 are countersunk adjacent the rear face 144 of the cavity module 116 and are sized to receive mold cavities 39 (see FIG. 6). The mold cavities 39 are of standard design and include a plurality of ridges 147 defining annular grooves 148 which are enclosed by the walls of the bores 140 to form annular channels to convey coolant about the cavity recess 150.

Figure 7:
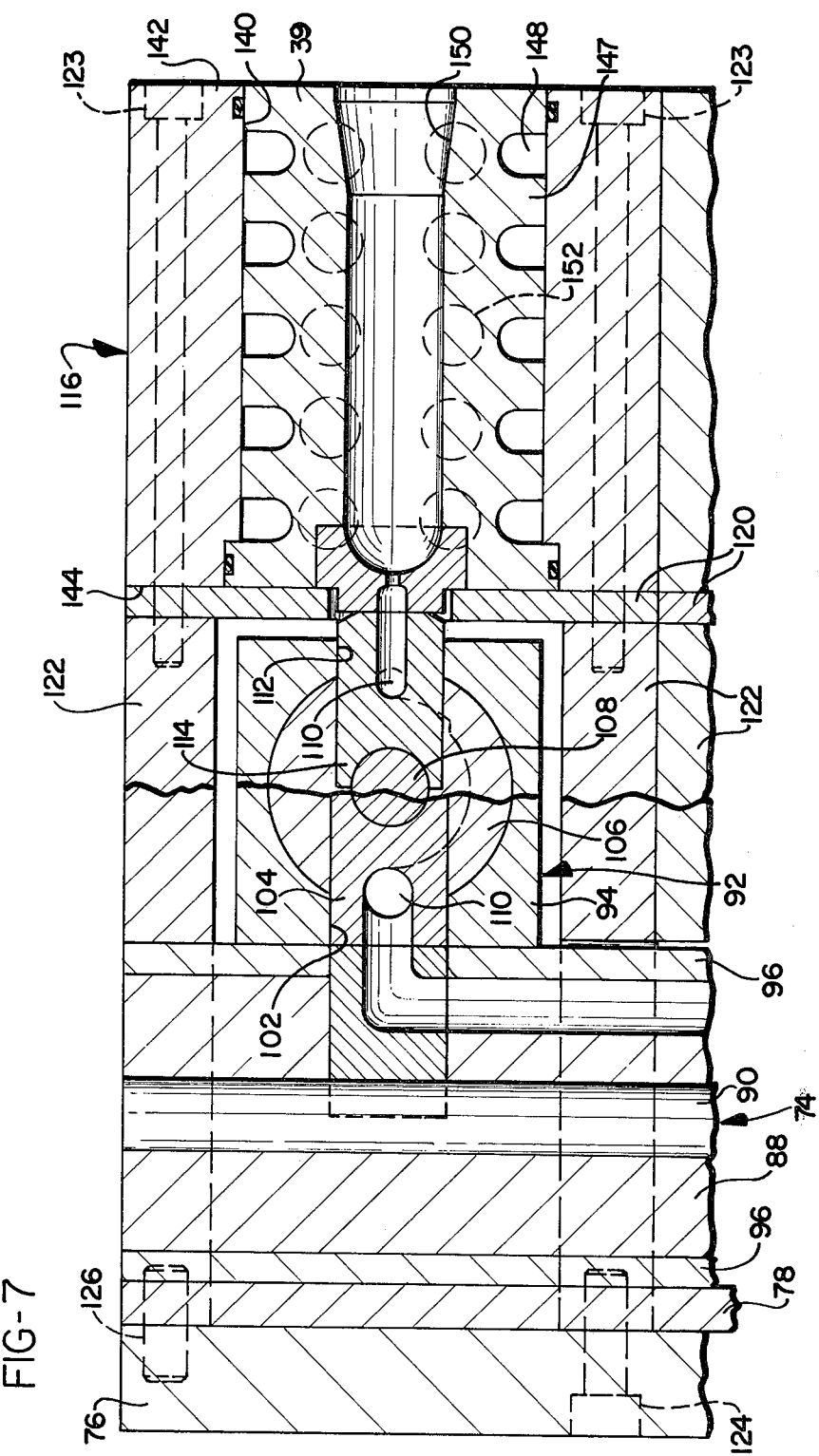
FIG. 7 is a sectional view through the array of FIG. 6 taken along line 7—7.

As best shown in FIGS. 7 and 8, the block 138 of the cavity module 116 includes ten circular coolant conduits 152 which pass through the longitudinal dimensions of the block and intersect the six bores 140. The conduits are arranged in five vertical rows of two, each row joined at the lower end of the block 138 by a separate joining conduit 154. At the upper end of the block 138, two transverse conduits 156, 158 are bored from the front face 142 to the rear face 144 to intersect five conduits 152 thereby forming two manifolds internally of the block 138. Thus, coolant flowing into one transverse conduit, for example 156, would flow through the five conduits 152 downwardly to the lower joining conduits 154, then up to the other five conduits 152 to their respective transverse conduit 158.

The transverse conduits 156, 158 communicate with cooling ports 160, 162 (see FIG. 5). Cooling ports 160, 162 communicate with a coolant manifold 164 of conventional design which is mounted to the top of the mold cavity array 30 by bolts 166 and is supplied by a source of coolant (not shown), which is typically water at about 40° F.

The ten longitudinal conduits 152 intersect the six cylindrical bores 140 and are positioned within the block 138 to be in registry with the annular grooves 148 so that each conduit supplies coolant to the enclosed annular grooves of each cavity 39. The annular grooves 148 are divided into two semi-circular portions by keys 168 which fit into mating slots formed in the cavities and extend from the front face 142 to the rear face 144. In this fashion, coolant flowing downwardly from transverse bore 156 through port 162 will stay to one side of the cavity 39 as it passes through the semi-circular portions of the annular grooves 148, and to the other side of the cavity as it flows upwardly to the transverse bore 158 and out port 160 to coolant manifold 164.

During the operation of the injection molding machine 14, pelletized plastic material is loaded into the hopper 18 and conveyed by the screw 20 along the housing 24, where it is liquified, to build up a charge at the orifice 22. Reciprocation of the screw 20, causes the change of molten plastic to be injected into the inlet sprue 80 of the primary manifold 74. From the inlet sprue 80 the plastic material travels through the runners 86 of the primary manifold 74 to the four outlet gates 82 and their respective outlet nozzles 84. The liquid plastic material is maintained in a molten state by the operation of the tubular heating element 90, which can be controlled by a thermostat (not shown).

From the outlet nozzles 84 of the primary manifold 74 the liquid plastic material flows into the respective inlet sprues 102 of each of the four secondary manifolds 92 and travels through the corresponding runners 110 to the twenty-four outlet gates 112 and outlet nozzles 114. The plastic material then flows into the twenty-four mold cavities 39 of the four six-cavity modules 116 to form products, such as parisons, within the cavity recesses 150 and about the cores 34. The heated plastic material is cooled within the recesses 150 by a coolant circulating through the respective conduits 152 and annular grooves 148 of each block 138 and cavity 38. When the molded parison has hardened and cooled sufficiently, it is removed from the cavity 118 by the ejector portion 32 of the molding machine 14. The heating element 108 of the secondary module 92 maintains the outlet nozzles 114 at a sufficiently high temperature to maintain the molten plastic material in the interface between the cavity 118 and the outlet nozzle 114 at an optimum viscosity which will neither block the nozzle nor create long strings of plastic as the hardened molded article is removed from the cavity.

However, if a recess 150 of a cavity 39 should become blocked or clogged, the respective cavity module 116 is merely removed from the injector portion 16 and from beneath the coolant manifold 164 by removing hex head bolts 123. A substitute module can then be inserted in the space and attached to the injector portion 16. In this fashion, the troublesome cavity 39 can be repaired while the molding machine 14 is permitted to continue operation. Downtime is reduced to the time it takes to replace a cavity module.

While the forms of apparatus herein described constitute preferred embodiments of this invention, it is to be understood that the invention is not limited to these precise forms of apparatus, and that changes may be made therein without departing from the scope of the invention.

What is claimed is:

1. For use with an injection molding apparatus of the type having an injector portion including a plurality of mold cavities communicating with a source of molten plastic material, a heated manifold comprising:
    an elongated shell having an exterior surface defining at least one inlet sprue for communicating with a source of material and a plurality of outlet gates for communicating with mold cavities;
    said shell having an interior portion defining a central longitudinal passage therethrough;
    heating means positioned within said passage for radiating heat into said interior portion; and
    said interior portion having a plurality of discrete spiral runners extending from said inlet sprue to said outlet gates and spiraling about said heating means such that molten plastic material may flow from said inlet sprue through said runners to said outlet gates and receive heat energy from said heating means.

2. The heated manifold of claim 1 wherein said runners are substantially circular in cross section.

3. The heated manifold of claim 1 wherein said inlet sprue is located on an opposite side of said exterior surface from said outlet gates.

4. The heated manifold of claim 3 wherein said outlet gates are positioned substantially along a line parallel to said central longitudinal passage.

5. The heated manifold of claims 1, 2, 3 or 4 wherein said runners are equal in length taken from said inlet sprue to said outlet gates.

6. The heated manifold of claims 1, 2, 3 or 4 wherein said interior portion of said shell includes:
   an interior surface defining a substantially cylindrical longitudinal bore; and
   a cylinder positioned within said bore, said cylinder having:
      said central longitudinal passage, and said heating means within said passage, and
      an outer surface having a first recess communicating with said inlet sprues, a plurality of second recesses communicating with said outlet gates, and a plurality of channels extending from said inlet recess to said outlet recesses, said channels being enclosed by said interior surface to form said spiral runners.

7. The heated manifold of claim 6 further comprising a plurality of said manifolds supported adjacent each other providing a two-dimensional array of outlet gates thereof, and a primary one of said manifolds being mounted such that outlet gates thereof adjoin inlet sprues of said plurality of manifolds, whereby said array of outlet gates is fed from an inlet sprue of said primary manifold through joined runners of said primary and plurality of manifolds and heat is applied by heating means of said manifolds to said runners.

8. The heated manifold of claim 6 wherein said bore and said cylinder are positioned centrally within said shell.

9. An improved injection molding apparatus of the type having an injector portion including a plurality of mold cavities communicating with a source of molten plastic material and an ejector portion for removing the molded parisons from said cavities, the improvement comprising:
   manifold means including elongated shell means having an exterior surface defining inlet sprue means communicating with said source of plastic and a plurality of outlet gates communicating with said cavities,
   said shell means having an interior portion defining central longitudinal passage means therethrough,
   heating means positioned within said passage means for heating said interior portion, and
   said interior portion having a plurality of discrete spiral runners extending from said inlet sprue means to said outlet gates and spiraling about said heating means such that molten plastic material may flow from said inlet sprue means through said runners and about said heating means to said outlet gates and receive heat energy from said heating means; and
   a cavity module including an oblong block sized to be placed in abutting relationship to said manifold means and having a front face for engaging said ejector portion and a rear face for abutting said manifold means,
   a plurality of mold cavities mounted within said block and communicating with at least a portion of said outlet gates;
   said block having a plurality of transverse bores extending from said front face to said rear face, sized to receive said cavities and form annular coolant channels therewith;
   said block including a plurality of conduits intersecting said coolant channels for circulating coolant from an external source about said cavities mounted within said bores; and
   means for mounting said block to said manifold.

10. The improved molding apparatus of claim 9 wherein said manifold means comprises:
    a primary manifold member having a first one of said elongated shell means, a primary one of said inlet sprue means and primary ones of said outlet gates; and
    a secondary manifold member having secondary ones of said shell means oriented parallel to each other and normal to said first shell means, said secondary shell means having secondary ones of said inlet sprue means in registry with said primary outlet gates and a plurality of secondary ones of said outlet gates communicating with said cavities.

11. The improved injection molding apparatus of claim 10 wherein said cavity module further comprises a plurality of blocks, each block having a top wall, bottom wall, and lateral walls such that said front and rear faces are rectangular in shape and said plurality of said blocks are placed in parallel abutting relationship to form a mold cavity array which is mounted to said secondary manifold member such that said cavities in said array are positioned in registry with said secondary outlet gates.

12. In an injection molding apparatus of the type having an injector portion including manifold means communicating with a source of molten plastic material and having a plurality of outlet nozzles, and a plurality of cylindrical mold cavities communicating with said outlet nozzles and an ejector portion for removing molded parisons from said cavities, a cavity module comprising:
    an oblong block having a front face for engaging said ejector portion and a rear face mounted to said manifold means;
    said block having a plurality of transverse bores extending from said front face to said rear face thereof, and sized to receive said cavities to form annular coolant channels therewith; and
    said block defining a plurality of conduits intersecting said coolant channels for circulating coolant from an external source about said cavities mounted within said bores.

13. The cavity module of claim 12 wherein said block includes an inlet port and an outlet port communicating with said conduits for conveying coolant from a coolant manifold to said conduits.

14. The cavity module of claim 12 wherein said block has a top wall, bottom wall, and lateral walls such that said front and rear surfaces are rectangular in shape so that a plurality of said cavity modules can be placed in parallel abutting relationship to form a mold cavity array in which said cavities in said array are positioned in registry with said outlet nozzles of said manifold means.

* * * * *

UNITED STATES PATENT AND TRADEMARK OFFICE
CERTIFICATE OF CORRECTION

PATENT NO. : 4,395,222

DATED : July 26, 1983

INVENTOR(S) : William R. Gaiser and John W. Gaiser

It is certified that error appears in the above—identified patent and that said Letters Patent is hereby corrected as shown below:

Column 10, line 61, "surfaces" should be --faces--.

Signed and Sealed this

Twenty-seventh Day of September 1983

[SEAL]

Attest:

GERALD J. MOSSINGHOFF

Attesting Officer     Commissioner of Patents and Trademarks